United States Patent
Song et al.

(10) Patent No.: US 9,237,530 B2
(45) Date of Patent: Jan. 12, 2016

(54) NETWORK LISTEN WITH SELF INTERFERENCE CANCELLATION

(71) Applicant: QUALCOMM Incorporated, San Diego, CA (US)

(72) Inventors: Bongyong Song, San Diego, CA (US); Kaushik Chakraborty, San Diego, CA (US); Samir Salib Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 13/673,946

(22) Filed: Nov. 9, 2012

(65) Prior Publication Data
US 2014/0134997 A1    May 15, 2014

(51) Int. Cl.
*H04W 52/24* (2009.01)

(52) U.S. Cl.
CPC .............. *H04W 52/244* (2013.01); *Y02B 60/50* (2013.01)

(58) Field of Classification Search
CPC ....... H04W 88/02; H04W 4/02; H04W 88/06; H04W 80/04; H04W 88/08; H04W 84/18; H04W 24/10; H04W 52/143; H04W 52/04; H04W 52/244; H04W 72/82; H03F 1/3247; H04L 27/368; H04L 25/03343; H04L 29/06
USPC ........ 455/422.1, 522; 375/296; 370/320, 321, 370/342, 350, 441, 479
See application file for complete search history.

(56) References Cited

U.S. PATENT DOCUMENTS

| | | | | |
|---|---|---|---|---|
| 5,828,659 A | * | 10/1998 | Teder | H04J 3/0682 370/328 |
| 5,872,774 A | | 2/1999 | Wheatley, III et al. | |
| 5,883,899 A | * | 3/1999 | Dahlman | H04B 1/707 370/320 |
| 5,896,368 A | * | 4/1999 | Dahlman | H04B 1/707 370/335 |

(Continued)

FOREIGN PATENT DOCUMENTS

| | | |
|---|---|---|
| CN | 1398079 A | 2/2003 |
| CN | 1875648 A | 12/2006 |

(Continued)

OTHER PUBLICATIONS

Yavuz, et al, "Interference Management and Perdormance Analysis of UMTS/HSPA+ FEMTOCELLS" IEEE.org, 2009.*

(Continued)

*Primary Examiner* — William D Cumming
(74) *Attorney, Agent, or Firm* — Nerrie M. Zohn

(57) ABSTRACT

A method for wireless communications includes reducing transmission power, by a femto base station, at its radio frequency (RF) transmitter, and cancelling a transmitted data signal of the RF transmitter at its network listen (NL) receiver. The reduction occurs in response to: occurrence of a network listen process; and/or a signal quality of the local macro coverage area exceeding a threshold quality. Additionally or alternatively, the femto base station may detect quality of its macro coverage area, and respond to the signal quality being below the threshold quality by: suspending reduction of transmission power and cancellation of the transmitted data signal; suspending the RF transmitter during transmission gaps assigned to user equipments (UEs); and triggering an NL operation in response to suspension of the RF transmitter, wherein the NL operation occurs within the duration of each of the transmission gaps.

24 Claims, 8 Drawing Sheets

(56) References Cited

U.S. PATENT DOCUMENTS

| | | | |
|---|---|---|---|
| 5,898,929 A | 4/1999 | Haartsen | |
| 6,151,311 A | 11/2000 | Wheatley, III et al. | |
| 6,307,840 B1 | 10/2001 | Wheatley, III et al. | |
| 6,433,739 B1 | 8/2002 | Soliman | |
| 6,590,881 B1 | 7/2003 | Wallace et al. | |
| 6,728,550 B1* | 4/2004 | Bohnke | H04W 52/04 370/321 |
| 6,847,630 B2 | 1/2005 | Blanz et al. | |
| 6,970,708 B1 | 11/2005 | Raith | |
| 6,983,031 B2 | 1/2006 | Wheatley | |
| 7,295,531 B2 | 11/2007 | Wheatley, III et al. | |
| 7,391,759 B2 | 6/2008 | Wallace et al. | |
| 7,512,111 B2 | 3/2009 | Kauhanen | |
| 7,929,970 B1 | 4/2011 | Gunasekara et al. | |
| 8,226,340 B1 | 7/2012 | Mahalingam | |
| 8,244,257 B2 | 8/2012 | Walldeen et al. | |
| 8,249,189 B2* | 8/2012 | Aoki | H04B 7/043 375/260 |
| 8,355,713 B1 | 1/2013 | Oh et al. | |
| 8,849,337 B2* | 9/2014 | Chande | H04W 24/10 455/443 |
| 8,903,448 B2* | 12/2014 | Chande | H04W 52/143 370/318 |
| 2003/0114204 A1 | 6/2003 | Allen et al. | |
| 2003/0123666 A1 | 7/2003 | Sambhwani et al. | |
| 2003/0194992 A1 | 10/2003 | Kim et al. | |
| 2004/0043746 A1 | 3/2004 | Hiramatsu | |
| 2005/0058097 A1 | 3/2005 | Kang et al. | |
| 2005/0094589 A1 | 5/2005 | Camp, Jr. et al. | |
| 2005/0099972 A1 | 5/2005 | Motegi et al. | |
| 2005/0130672 A1 | 6/2005 | Dean et al. | |
| 2005/0186933 A1 | 8/2005 | Trans | |
| 2006/0293067 A1 | 12/2006 | Leung et al. | |
| 2007/0053340 A1 | 3/2007 | Guilford | |
| 2007/0093268 A1 | 4/2007 | Hosono et al. | |
| 2007/0230393 A1 | 10/2007 | Sinha et al. | |
| 2007/0254620 A1 | 11/2007 | Lindqvist et al. | |
| 2007/0286136 A1 | 12/2007 | Rittle et al. | |
| 2008/0002660 A1 | 1/2008 | Jeong et al. | |
| 2008/0176568 A1 | 7/2008 | Palanki et al. | |
| 2008/0181195 A1 | 7/2008 | Cho et al. | |
| 2008/0188266 A1 | 8/2008 | Carter et al. | |
| 2008/0254812 A1 | 10/2008 | Kitazoe | |
| 2008/0261596 A1 | 10/2008 | Khetawat et al. | |
| 2008/0268856 A1 | 10/2008 | Francalanci et al. | |
| 2008/0285529 A1 | 11/2008 | Kwak et al. | |
| 2008/0285539 A1 | 11/2008 | Tiedemann, Jr. et al. | |
| 2008/0311926 A1 | 12/2008 | Fischer et al. | |
| 2009/0067417 A1 | 3/2009 | Kalavade et al. | |
| 2009/0086691 A1 | 4/2009 | Balasubramanian | |
| 2009/0092122 A1 | 4/2009 | Czaja et al. | |
| 2009/0097452 A1 | 4/2009 | Gogic | |
| 2009/0131049 A1 | 5/2009 | Osborn | |
| 2009/0163216 A1 | 6/2009 | Hoang et al. | |
| 2009/0164547 A1 | 6/2009 | Ch'ng et al. | |
| 2009/0185632 A1 | 7/2009 | Cai et al. | |
| 2009/0196266 A1 | 8/2009 | Wu et al. | |
| 2009/0210888 A1 | 8/2009 | Lee et al. | |
| 2009/0219888 A1 | 9/2009 | Chen et al. | |
| 2009/0221303 A1 | 9/2009 | Soliman | |
| 2009/0247084 A1 | 10/2009 | Palanki | |
| 2009/0253421 A1 | 10/2009 | Camp, Jr. et al. | |
| 2009/0258672 A1 | 10/2009 | Camp, Jr. et al. | |
| 2009/0290555 A1 | 11/2009 | Alpert et al. | |
| 2009/0316591 A1 | 12/2009 | Reial et al. | |
| 2009/0316654 A1 | 12/2009 | Prakash et al. | |
| 2010/0027694 A1 | 2/2010 | Touboul et al. | |
| 2010/0035601 A1 | 2/2010 | Chen et al. | |
| 2010/0035629 A1 | 2/2010 | Soliman | |
| 2010/0041364 A1 | 2/2010 | Lott et al. | |
| 2010/0046494 A1 | 2/2010 | Palanki et al. | |
| 2010/0054237 A1 | 3/2010 | Han et al. | |
| 2010/0061356 A1 | 3/2010 | Qvarfordt et al. | |
| 2010/0067433 A1 | 3/2010 | Cheng et al. | |
| 2010/0067507 A1 | 3/2010 | Park | |
| 2010/0085913 A1 | 4/2010 | Subrahmanya | |
| 2010/0105377 A1 | 4/2010 | Iwamura et al. | |
| 2010/0111070 A1 | 5/2010 | Hsu | |
| 2010/0135248 A1 | 6/2010 | Aramaki et al. | |
| 2010/0136997 A1 | 6/2010 | Palanki et al. | |
| 2010/0150109 A1 | 6/2010 | Bradley et al. | |
| 2010/0157906 A1 | 6/2010 | Yang et al. | |
| 2010/0173630 A1 | 7/2010 | Han et al. | |
| 2010/0197309 A1 | 8/2010 | Fang et al. | |
| 2010/0203891 A1 | 8/2010 | Nagaraja et al. | |
| 2010/0210239 A1 | 8/2010 | Karaoguz et al. | |
| 2010/0222068 A1 | 9/2010 | Gaal et al. | |
| 2010/0242103 A1 | 9/2010 | Richardson et al. | |
| 2010/0260168 A1 | 10/2010 | Gheorghiu et al. | |
| 2010/0260288 A1* | 10/2010 | Aoki | H04B 7/043 375/296 |
| 2011/0002284 A1 | 1/2011 | Talwar et al. | |
| 2011/0019604 A1 | 1/2011 | Chun et al. | |
| 2011/0058503 A1 | 3/2011 | Ono | |
| 2011/0059739 A1 | 3/2011 | Huang | |
| 2011/0098042 A1 | 4/2011 | Mach et al. | |
| 2011/0128916 A1 | 6/2011 | Kwon et al. | |
| 2011/0158164 A1 | 6/2011 | Palanki et al. | |
| 2011/0182252 A1 | 7/2011 | Liu et al. | |
| 2011/0275402 A1 | 11/2011 | Charipadi et al. | |
| 2011/0281571 A1 | 11/2011 | Patel et al. | |
| 2011/0281574 A1 | 11/2011 | Patel et al. | |
| 2011/0300870 A1 | 12/2011 | Chun et al. | |
| 2011/0312317 A1 | 12/2011 | Sahin et al. | |
| 2012/0040659 A1 | 2/2012 | Iwamura et al. | |
| 2012/0044908 A1 | 2/2012 | Spinelli et al. | |
| 2012/0046025 A1 | 2/2012 | Das et al. | |
| 2012/0046026 A1* | 2/2012 | Chande | H04W 24/10 455/422.1 |
| 2012/0046063 A1* | 2/2012 | Chande | H04W 52/143 455/522 |
| 2012/0052793 A1 | 3/2012 | Brisebois et al. | |
| 2012/0052855 A1 | 3/2012 | Soliman et al. | |
| 2012/0069800 A1 | 3/2012 | Soliman et al. | |
| 2012/0094663 A1 | 4/2012 | Awoniyi et al. | |
| 2012/0115496 A1 | 5/2012 | Soliman et al. | |
| 2012/0142392 A1 | 6/2012 | Patel et al. | |
| 2012/0178482 A1 | 7/2012 | Seo et al. | |
| 2012/0184206 A1 | 7/2012 | Kim et al. | |
| 2013/0005326 A1 | 1/2013 | Flanagan | |
| 2013/0059592 A1 | 3/2013 | Chakraborty et al. | |
| 2013/0095789 A1 | 4/2013 | Keevill et al. | |
| 2013/0294425 A1 | 11/2013 | Song et al. | |
| 2014/0134997 A1* | 5/2014 | Song | H04W 52/244 455/422.1 |
| 2015/0011254 A1* | 1/2015 | Chande | H04W 24/10 455/522 |
| 2015/0043437 A1* | 2/2015 | Chakraborty | H04W 72/082 370/329 |

FOREIGN PATENT DOCUMENTS

| | | |
|---|---|---|
| CN | 101155167 A | 4/2008 |
| EP | 1089499 A2 | 4/2001 |
| EP | 1809056 A2 | 7/2007 |
| EP | 1871035 A1 | 12/2007 |
| GB | 2446192 | 8/2008 |
| JP | 6334593 A | 12/1994 |
| JP | 2002505542 A | 2/2002 |
| JP | 2004112225 A | 4/2004 |
| JP | 2005184824 A | 7/2005 |
| JP | 2007534221 A | 11/2007 |
| JP | 2007536788 A | 12/2007 |
| JP | 2008172380 A | 7/2008 |
| JP | 4352281 B1 | 10/2009 |
| JP | 2009232434 A | 10/2009 |
| JP | 2009239568 A | 10/2009 |
| JP | 2010041537 A | 2/2010 |
| JP | 2010512054 A | 4/2010 |
| JP | 2010166163 A | 7/2010 |
| KR | 20100034579 A | 4/2010 |
| WO | 9809390 A1 | 3/1998 |
| WO | WO-9937037 | 7/1999 |
| WO | 9944306 A1 | 9/1999 |

(56) References Cited

FOREIGN PATENT DOCUMENTS

| WO | 03043229 | A1 | 5/2003 |
|---|---|---|---|
| WO | 2005048628 | A1 | 5/2005 |
| WO | 2005109767 | A1 | 11/2005 |
| WO | 2008066957 | A2 | 6/2008 |
| WO | 2008094334 | A1 | 8/2008 |
| WO | 2008139707 | A1 | 11/2008 |
| WO | WO-2008140225 | A1 | 11/2008 |
| WO | WO2009006041 | A1 | 1/2009 |
| WO | 2010017226 | A2 | 2/2010 |
| WO | 2010022371 | | 2/2010 |
| WO | 2010033413 | | 3/2010 |
| WO | 2010033438 | | 3/2010 |
| WO | WO2010059750 | | 5/2010 |
| WO | WO2011011760 | A2 | 1/2011 |
| WO | WO2011063044 | A1 | 5/2011 |
| WO | WO2011109466 | | 9/2011 |

OTHER PUBLICATIONS

3GPP TR 36.922 version 9.0.0 Release 9; LTE; Evolved Universal Terrestrial Radio Access (E-UTRA);TDD Home eNode B (HeNB) Radio Frequency (RF) requirements analysis, ETSI TR 136 922 V9.0.0, pp. 1-77, Apr. 2010.

"3rd Generation Partnership Project; Technical Specification Group Radio Access Network; Evolved Universal Terrestrial Radio Access (E-UTRA); TDD Home eNode B (HeNB) Radio Frequency (RF) requirements analysis (Release 9)", 3GPP Standard; 3GPP TR 36.922, 3rd Generation Partnership Project (3GPP), Mobile Competence Centre ; 650, Route Des Lucioles ; F-06921 Sophia-antipolis Cedex ; France, No. V9.1.0, Jun. 21, 2010, pp. 1-74, XP050441979, [retrieved on Jun. 21, 2010].

3rd Generation Partnership Project, Technical Specification Group Radio Access Networks, Home Node B Radio Frequency (RF) Requirements (FDD) (Release 9), 3GPP Standard, 3GPP TR 25.967, 3rd Generation Partnership Project (3GPP), Mobile Competence Centre, 650, Route Des Lucioles, F-06921 Sophia-antipolis Cedex, France, No. 9.0.0, May 1, 2009, pp. 1-55, XP050369580, paragraph [0007].

LG Electronics: "Methods to facilitate the inter-cell coordination in heterogeneous networks", 3GPP Draft; R1-105358 Coordination_Method, 3rd Generation Partnership Project (3GPP), Mobile Competence Centre ; 650, Route Des Lucioles ; F-06921 Sophia-Antipolis Cedex ; France, vol. RAN WG1, No. Xi'an; 20101011, Oct. 5, 2010, XP050450509, [retrieved on Oct. 5, 2010].

Mediatek Inc: "Further Discussion on HeNB Downlink Power Setting in HetNet", 3GPP Draft; R1-105238 Power Setting in Hetnet, 3rd Generation Partnership Project (3GPP), Mobile Competence Centre ; 650, Route Des Lucioles ; F-06921 Sophia-Antipolis Cedex; France, vol. RAN WG1, No. Xi 'An; 20101011, Oct. 5, 2010, XP050450424, [retrieved on Oct. 10, 2010].

Mitsubishi Electric: "Dynamic Setup of HNBs for Energy Savings and Interference Reduction", 3GPP Draft; R3-081949 (Dynamic Setup HNBS), 3rd Generation Partnership Project (3GPP), Mobile Competence Centre ; 650, Route Des Lucioles ; F-06921 Sophia-Antipolis Cedex ; France, vol . RAN WG3, No. Jeju Island; 20080813, Aug. 13, 2008, XP050165010, [retrieved on Aug. 13, 2008].

QUALCOMM Europe et al., "TDD HeNB Synchronization Requirement for Large Propagation Distance Case", 3GPP Draft, R4-094985, 3rd Generation Partnership Project (3GPP), Mobile Competence Centre, 650, Route Des Lucioles, F-06921 Sophia-Antipolis Cedex, France, No. Jeju, 20091109, Nov. 9, 2009, XP050394434, [retrieved on Nov. 17, 2009].

QUALCOMM Europe: "HeNB Timing Requirements", 3GPP Draft, R4-091902 Timing Requirements, 3rd Generation Partnership Project (3GPP), Mobile Competence Centre, 650, Route Des Lucioles, F-06921 Sophia- Antipolis Cedex, France, No. San Francisco, 20090427, Apr. 27, 2009, XP050342629, [retrieved on Apr. 27, 2009] paragraph [0002].

QUALCOMM Europe: "Text Proposal on TDD HeNB Synchronization Requirement", 3GPP Draft, R4-093725 Text Proposal for HENB Sync Requirements, 3rd Generation Partnership Project (3GPP), Mobile Competence Centre, 650, Route Des Lucioles, F-06921 Sophia-Antipolis Cedex, France, No. Miyazaki, 20091012, Oct. 12, 2009, XP050393326, [retrieved on Oct. 6, 2009].

QUALCOMM Europe: "Synchronization Requirements and Techniques", 3GPP Draft, R4-091336, 3rd Generation Partnership Project (3GPP), Mobile Competence Centre, 650, Route Des Lucioles, F-06921 Sophia-Antipolis Cedex, France, No. Seoul, Korea, 20090319, Mar. 19, 2009, XP050342103, [retrieved on Mar. 19, 2009].

Universal Mobile Telecommunications System (UMTS), Physical layer, Measurements (TDD) (3GPP TS 25.225 version 8.2.0 Release 8), ETSI TS 125 225, ETSI Standard, European Telecommunications Standards Institute (ETSI), Sophia Antipolis Cedex, France, vol. 3-R1, No. V8.2.0, Mar. 1, 2009, XP014043978, paragraph [0007].

Co-pending U.S. Appl. No. 61/094,100, filed on Sep. 4, 2008.

Damnjanovic et al., "A Survey on 3GPP Heterogeneous Networks", IEEE Wireless Communications, pp. 10-21 (Jun. 2011).

Domenico A.D., et al., "A Survey on MAC Strategies for Cognitive Radio Networks", IEEE Communications Surveys, IEEE, New York, NY, US, vol. 14, No. 1, Jan. 1, 2012, pp. 21-44, XP011420410, ISSN: 1553-877X, DOI: 10.1109/SURV.2011.111510.00108.

International Search Report and Written Opinion—PCT/US2013/069259—ISA/EPO—Jan. 17, 2014.

Motorola: "PCID confusion", R2-092307, 3GPP TSG RAN WG2 #65bis Mar. 23-27, 2009, Seoul, Korea, pp. 1-3.

QUALCOMM Europe: "Network support for inbound handover of pre-Rel-9 UMTS UEs", R3-091213, 3GPP TSG RAN WG 3 #64, May 4-8, 2009 San Francisco, USA, pp. 1-3.

* cited by examiner

NETWORK LISTEN WITH SELF INTERFERENCE CANCELLATION

BACKGROUND

1. Field

Aspects of the present disclosure relate generally to wireless communication systems, and more particularly, to femto base stations having network listen with self-interference cancellation.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

In a heterogeneous wireless network operating with macro and femto base stations, femto base stations may listen for neighboring macro base station downlink signals in order to determine time and frequency synchronization. The network listen (NL) process conducted by the femto base stations may either be out-of-band, in which the NL transceiver operates in a different frequency band than the femto transceiver, or in-band, in which the NL and femto transceivers operate in the same frequency band. An in-band NL process results in substantial interference because of the RF coupling between the femto transmitter and NL receiver. To alleviate this interference, the femto transmitter may be suspended while the femto is performing the NL process through the NL transceiver. However, suspending the femto transmitter may result in degradation of quality of service for both voice and data services either through voice quality degradation or loss of data packets for data calls. Due to stringent latency requirements, this degradation may more severely impact voice quality for UEs conducting voice calls in communication with the femto base station.

SUMMARY

The various aspects of the present disclosure are directed to techniques for improving the in-band NL process by reducing the transmission power in the femto transmitter (e.g., during the network listen periods and/or when macro coverage area signal quality exceeds a threshold quality) and canceling the femto transmission signal at the NL receiver are described herein.

In some aspects, a method for wireless communications includes reducing transmission power, by a femto base station, at a radio frequency (RF) transmitter of the femto base station. The method additionally includes canceling a transmitted data signal, by the femto base station, at a network listen (NL) receiver of the femto base station, wherein the transmitted data signal was transmitted by the RF transmitter. Also, the reduction of transmission power occurs in response to one or more of: occurrence of a network listen process; or a signal quality of a macro coverage area in which the femto base station is located exceeding a threshold quality.

In additional or alternative aspects, the method may include detecting the signal quality of the macro coverage area in which the femto base station is located, and carrying out a set of procedures in response to the signal quality being below the threshold quality. For example, the set of procedures may include, suspending the reducing transmission power and the canceling the transmitted data signal. Additionally, the set of procedures may include suspending, by the femto base station, the RF transmitter of the femto base station during each of a plurality of transmission gaps assigned to one or more user equipments (UEs) in communication with the femto base station. Also, the set of procedures may include triggering a network listen operation in response to the suspending the RF transmitter, wherein the network listen operation occurs within the duration of each of the plurality of transmission gaps.

In other aspects, an apparatus for wireless communications includes means for reducing transmission power, by a femto base station, at a radio frequency (RF) transmitter of the femto base station. The apparatus additionally includes means for canceling a transmitted data signal, by the femto base station, at a network listen (NL) receiver of the femto base station, wherein the transmitted data signal was transmitted by the RF transmitter. Also, the means for reducing transmission power operatively reduces the transmission power in response to one or more of: occurrence of a network listen process; or a signal quality of a macro coverage area in which the femto base station is located exceeding a threshold quality.

In additional or alternative aspects, the apparatus may include means for detecting the signal quality of the macro coverage area in which the femto base station is located, and means responsive to the signal quality being below the threshold quality. For example, the means responsive to the signal quality being below the threshold quality may include means for suspending the means for reducing transmission power and the means for canceling the transmitted data signal. Additionally, the means responsive to the signal quality being below the threshold quality may include means for suspending, by the femto base station, the RF transmitter of the femto base station during each of a plurality of transmission gaps assigned to one or more user equipments (UEs) in communication with the femto base station. Also, the means responsive to the signal quality being below the threshold quality may include means for triggering a network listen operation in response to suspension of the RF transmitter, wherein the network listen operation occurs within the duration of each of the plurality of transmission gaps.

In additional aspects, a computer program product includes a non-transitory computer-readable medium. The computer-readable medium includes code for reducing transmission power, by a femto base station, at a radio frequency (RF) transmitter of the femto base station. The computer-readable medium additionally includes code for canceling a transmitted data signal, by the femto base station, at a network listen (NL) receiver of the femto base station, wherein the transmitted data signal was transmitted by the RF transmitter. Also, the code for reducing transmission power operatively reduces the transmission power in response to one or more of: occurrence of a network listen process; or a signal quality of a macro coverage area in which the femto base station is located exceeding a threshold quality.

In additional or alternative aspects, the non-transitory computer-readable medium may include code for detecting the signal quality of the macro coverage area in which the femto base station is located, and code responsive to the signal quality being below the threshold quality. For example, the code responsive to the signal quality being below the threshold quality may include code for suspending the code for reducing transmission power and the canceling the transmitted data signal. Additionally, the code responsive to the signal quality being below the threshold quality may include code for suspending, by the femto base station, the RF transmitter of the femto base station during each of a plurality of transmission gaps assigned to one or more user equipments (UEs) in communication with the femto base station. Also, the code responsive to the signal quality being below the threshold quality may include code for triggering a network listen operation in response to suspension of the RF transmitter, wherein the network listen operation occurs within the duration of each of the plurality of transmission gaps.

In further aspects, a femto base station includes one or more processors and a memory coupled to the one or more processors. The one or more processors are configured to reduce transmission power, by the femto base station, at a radio frequency (RF) transmitter of the femto base station. The one or more processors are additionally configured to cancel a transmitted data signal, by the femto base station, at a network listen (NL) receiver of the femto base station, wherein the transmitted data signal was transmitted by the RF transmitter. The one or more processors operatively reduce transmission power in response to one or more of: occurrence of a network listen process; or a signal quality of a macro coverage area in which the femto base station is located exceeding a threshold quality.

In additional or alternative aspects, the one or more processors may further be configured to detect the signal quality of the macro coverage area in which the femto base station is located, and respond to the signal quality being below the threshold quality. For example, the one or more processors may suspend reduction of transmission power and cancelation of the transmitted data signal in response to the signal quality being below the threshold quality. Also, the one or more processors may, in response to the signal quality being below the threshold quality, suspend, by the femto base station, the RF transmitter of the femto base station during each of a plurality of transmission gaps assigned to one or more user equipments (UEs) in communication with the femto base station. Additionally, the one or more processors may trigger a network listen operation in response to suspension of the RF transmitter, wherein the network listen operation occurs within the duration of each of the plurality of transmission gaps.

Various aspects and features of the disclosure are described in further detail below.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
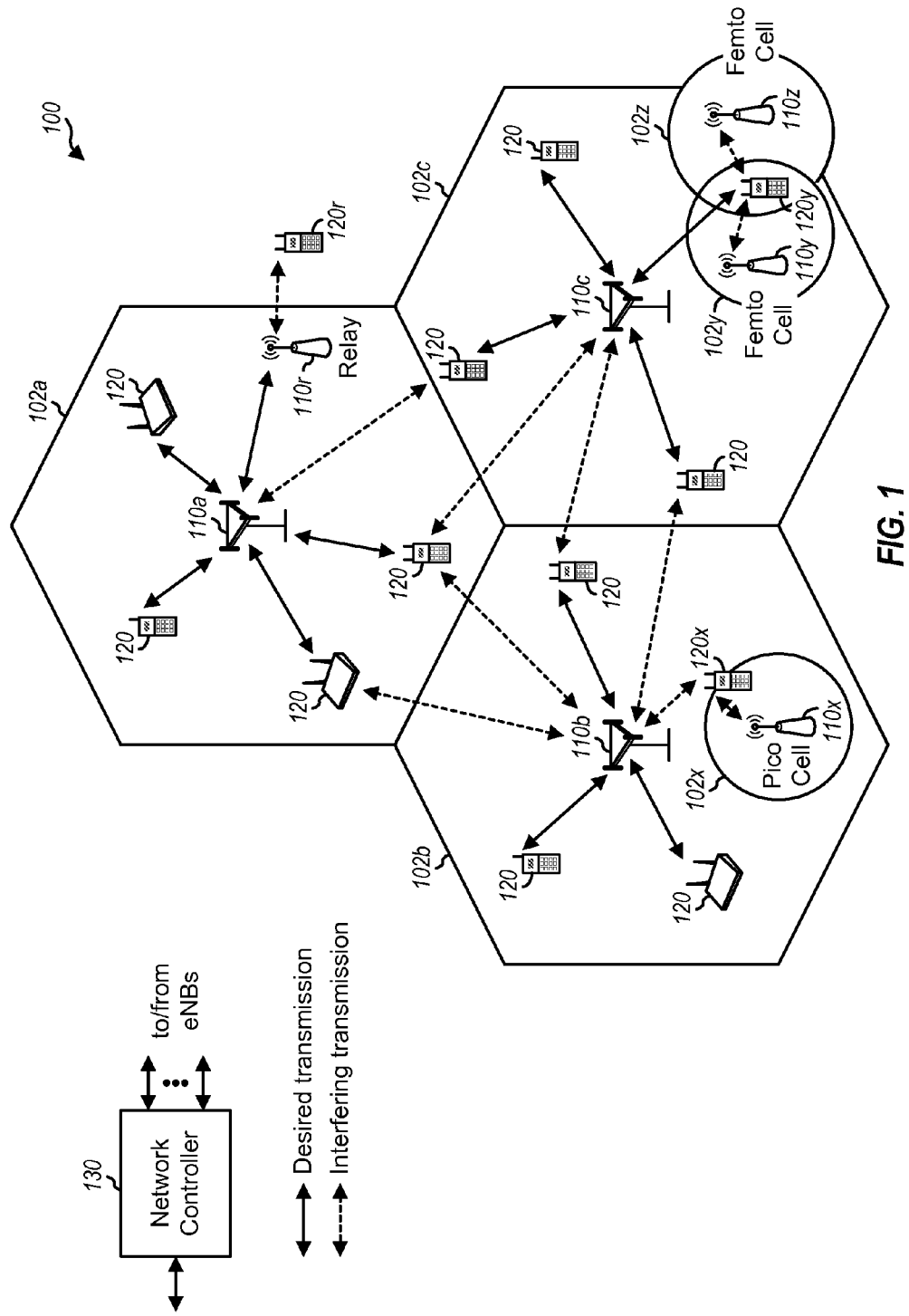
FIG. 1 is a block diagram conceptually illustrating an example of a telecommunications system.

FIG. 1 shows a wireless communication network 100, which may be an LTE network. The wireless network 100 may include a number of evolved NodeBs (eNodeBs) 110 and other network entities. An eNodeB may be a station that communicates with the UEs and may also be referred to as a base station, an access point, etc. A NodeB is another example of a station that communicates with the UEs.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 5 W-40 W) whereas pico eNodeBs, femto eNodeBs and relays may have a lower transmit power level (e.g., 100 mW-200 mW).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
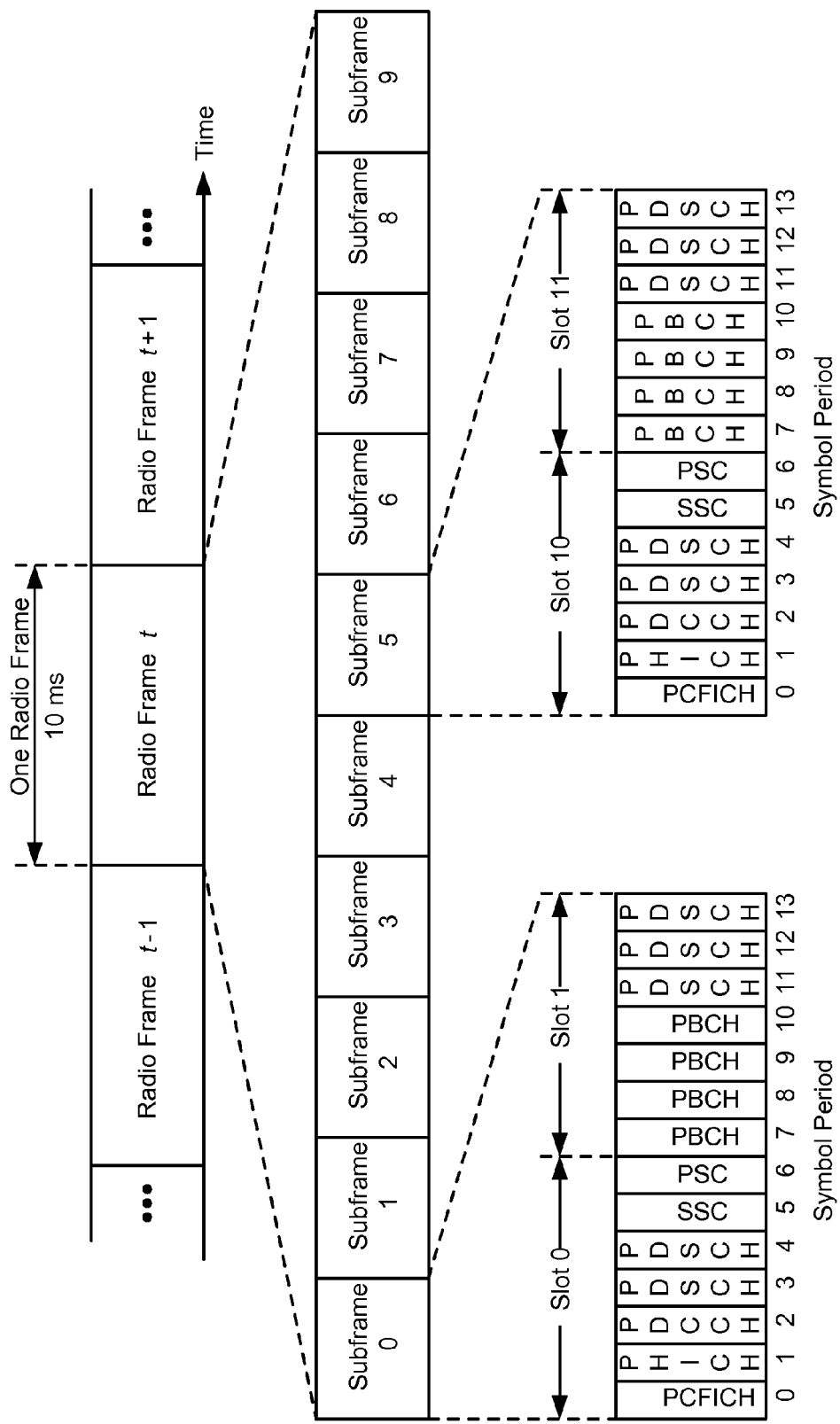
FIG. 2 is a block diagram conceptually illustrating an example of a down link frame structure in a telecommunications system.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
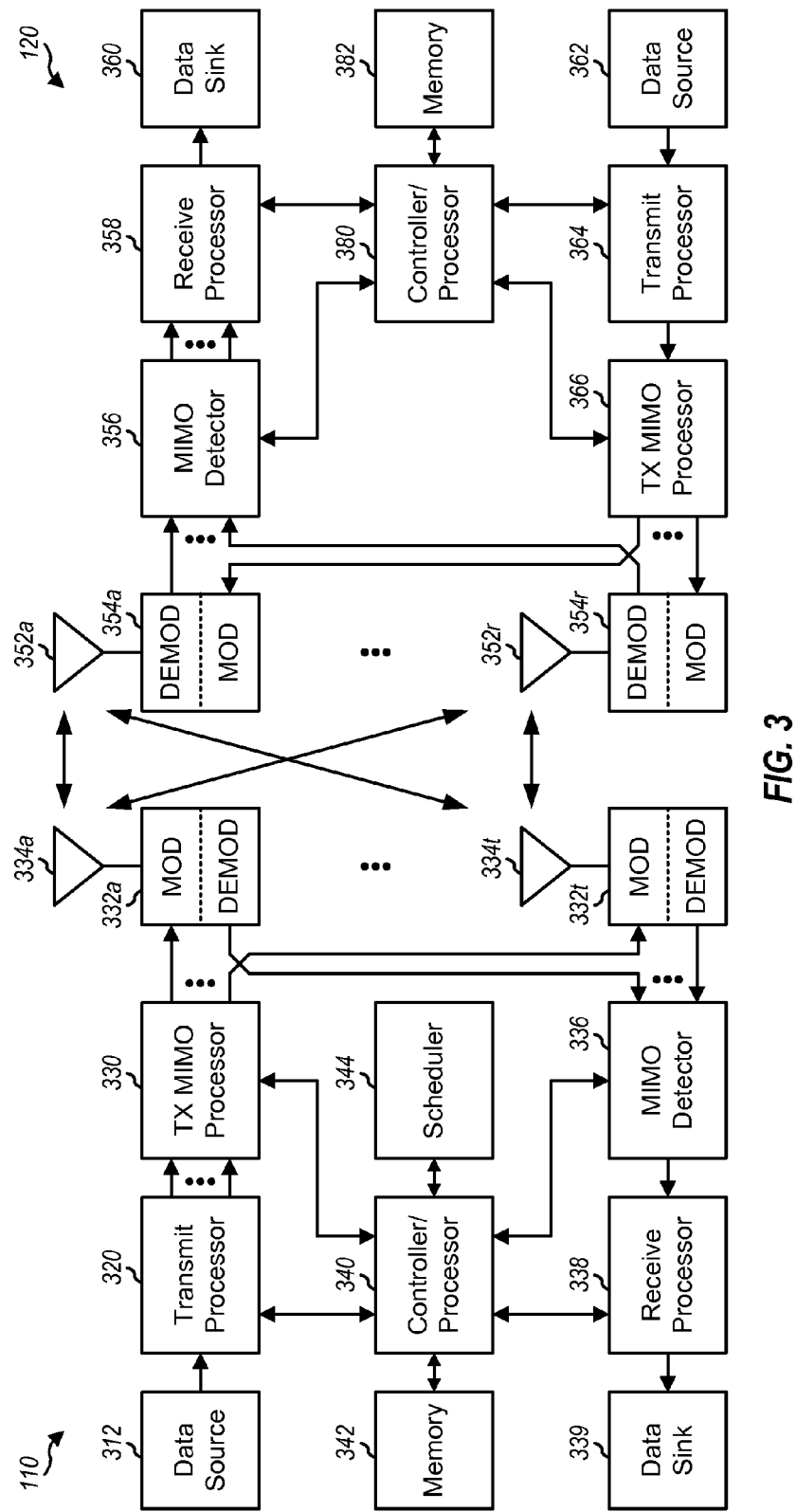
FIG. 3 is a block diagram conceptually illustrating a design of an eNodeB and a UE configured according to one aspect of the present disclosure.

FIG. 3 shows a block diagram of a design of an eNodeB 110 and a UE 120, which may be one of the eNodeBs and one of the UEs in FIG. 1. For a restricted association scenario, the eNodeB 110 may be the macro eNodeB 110c in FIG. 1, and the UE 120 may be the UE 120y. The eNodeB 110 may be equipped with antennas 334a through 334t, and the UE 120 may be equipped with antennas 352a through 352r.

At the eNodeB 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the eNodeB 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the eNodeB 110. At the eNodeB 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNodeB 110 and the UE 120, respectively. The processor 340 and/or other processors and modules at the eNodeB 110 may perform or direct the execution of various processes for the techniques described herein. The processor 380 and/or other processors and modules at the UE 120 may also perform or direct the execution of the functional blocks illustrated in FIGS. 4-8, and/or other processes for the techniques described herein. The memories 342 and 382 may store data and program codes for the eNodeB 110 and the UE 120, respectively. A scheduler 344 may schedule UEs for data transmission on the downlink and/or uplink.

In one configuration, the UE 120 for wireless communication includes means for detecting interference from an interfering eNodeB during a connection mode of the UE, means for selecting a yielded resource of the interfering eNodeB, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

Figure 4:
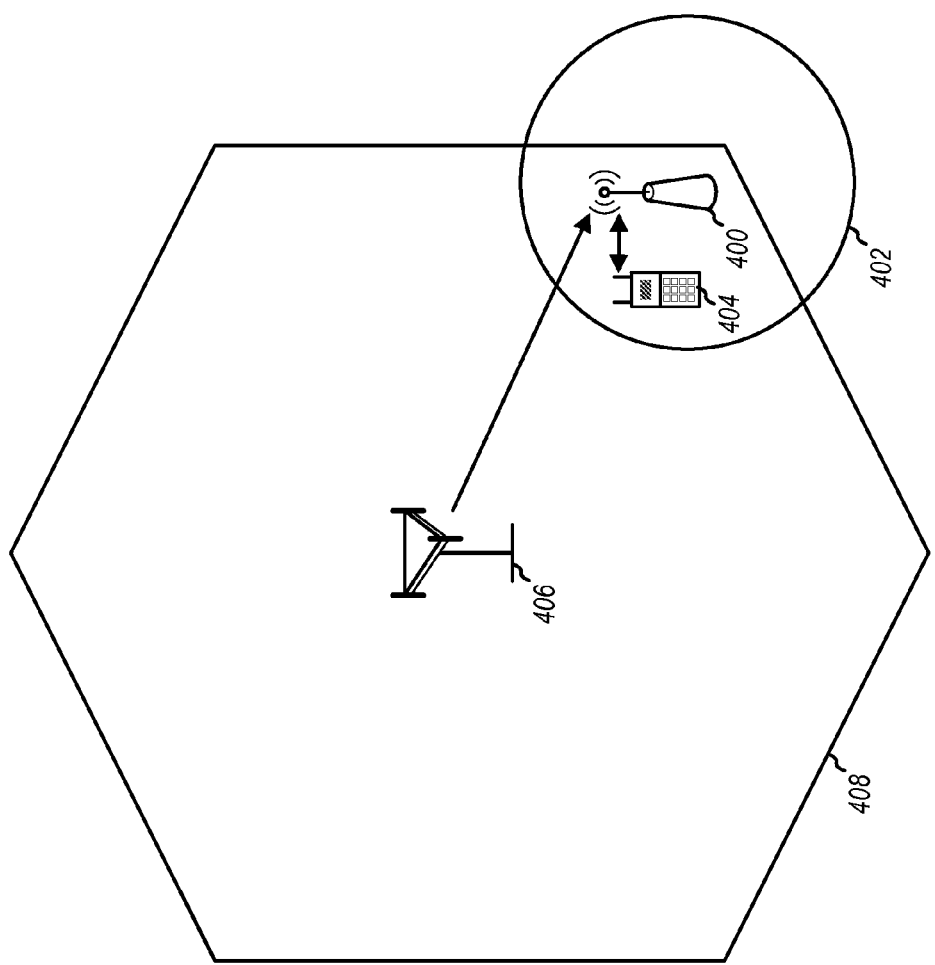
FIG. 4 is a block diagram conceptually illustrating an example of a femto base station in a macro coverage area.

FIG. 4 shows a femto base station 400 that listens for downlink signals of a neighboring macro base station 406 in order to determine time and frequency synchronization. As mentioned above, the network listen (NL) process conducted by the femto base station 400 may be in-band, in which the NL and femto transceivers of femto base station 400 operate in the same frequency band. An in-band NL process results in substantial interference because of the RF coupling between the femto transmitter and NL receiver. To alleviate this interference, the femto transmitter of femto base station 400 may be suspended while the femto base station 400 performs the NL process through the NL transceiver. However, suspending the femto transmitter may result in degradation of quality of service for both voice and data services either through voice quality degradation or loss of data packets for data calls. Due to stringent latency requirements, this degradation may more severely impact voice quality for a UE 404 conducting voice calls in communication with the femto base station 400.

As explained in more detail below, the femto base station 400 may monitor signal quality within the macro coverage area 408, and adjust the strength of the femto transmitter signal within its own coverage area 402 at least partly in response to the signal quality of the macro coverage area 408. Doing so may permit effective cancellation of the femto transmitter signal at the network listen transceiver, without requiring suspension of the femto transmitter during network listen processes. Accordingly, suspension of the femto transmitter may be avoided so long as the signal quality within the macro coverage area is sufficient to accommodate reduction of the femto transmitter power.

Figure 5:
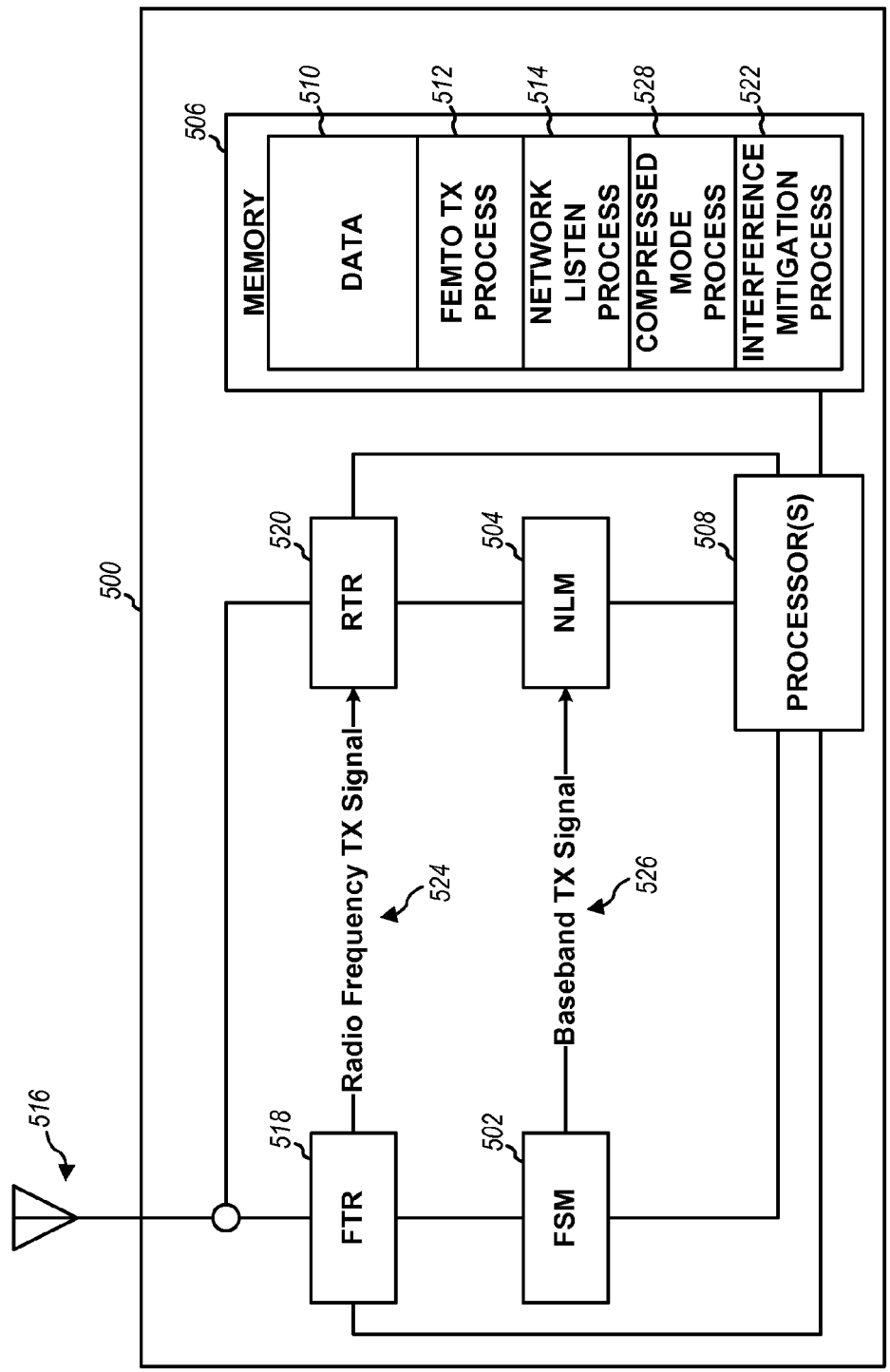
FIG. 5 is a block diagram conceptually illustrating a design of a femto base station configured according to an aspect of the present disclosure.

FIG. 5 shows a design of a femto base station 500 configured according to an aspect of the present disclosure. The femto base station 500 may have a femto station modem 502, a network listen module 504, and a memory 506 connected to one or more computer processors 508. Memory 506 may be a non-transitory computer-readable medium capable of storing data 510 and code, including femto transmission process 512 and network listen (NL) process 514. As will be readily apparent to one skilled in the art, the femto transmission process 512 and network listen process 514 may configure the one or more processors 506 to operate the femto station modem 502 and NL module 504 in a manner that provides voice communication and data services over a wireless radio frequency communications network. As will also be readily understood, an RF antenna 516 may be interfaced with two or more transceivers configured as femto transceiver 518 and NL transceiver 520, and these components may provide a switchable signal path by which signals are converted between radio frequency and baseband, and routed between antenna 516 and the modems 502 and 504.

As noted above, in-band NL may result in substantial interference because of the RF coupling between a femto transmitter (i.e., of the femto transceiver 518 and femto station modem 502) and an NL receiver (i.e., of the NL transceiver 520 and NL module 504). The present disclosure is directed to improving the in-band NL process 514 by reducing the transmission power in the femto transmitter (e.g., during the network listen periods and/or when macro coverage area signal quality exceeds a threshold quality) and canceling the femto transmission signal at the NL receiver. The interference cancellation of the transmitted signal may be performed at the RF level, at base band, or in a combination of RF and base band. Accordingly, the NL process 514 may be enabled by the femto base station 500 with reduced impact on the voice call quality for UEs conducting voice calls or with reduced incidence of the loss of data packets for UEs conducting data calls.

In order to perform the interference cancellation as described above, code comprising an interference mitigation process 522 may be contained in memory 506. The interference mitigation process 522 may configure processors 508 to employ the RF transmitter signal 524 from the femto transceiver 518 and/or the baseband transmitter signal from the femto station modem 526 to cancel interference at the NL transceiver 520 and/or NL module 504. It is envisioned that the radio frequency level and/or base band level interference cancellation may be performed in software, in hardware, or combinations thereof.

Additional aspects may involve detecting when the femto base station 500 may be in a weak macro coverage area. When a weak coverage area is detected, the femto base station 500 may not be able to reduce its transmission power enough to obtain good interference cancellation at the NL receiver, while still maintaining satisfactory data transmission. Thus, when the weak coverage is detected, the femto base station 500 may improve the in-band NL process 514 by synchronizing the NL process 514 with network transmission gaps.

In various wireless communication technologies, transmission gaps are defined during which UEs tune away from their currently serving cell to perform measurements on neighboring cells of a different frequency than the currently serving cell. During these transmission gaps, UEs do not expect to receive any transmissions from the currently serving cell. Thus, when in a weak macro coverage area, the femto base station 500 may suspend the transmitter of the femto transceiver 518 during the transmission gaps, while, at the same time, performing NL measurements without risk of losing any voice or data packets either due to suspending the femto transmitter during the NL process or due to femto/NL transceiver interference.

In order to carry out the above process, a compressed mode process 528 recorded in memory 506 may configure processors 508 of femto base station 500 to identify voice users, and to assign synchronous transmission gaps to the voice users. Interference mitigation process 522 may configure processors 508 to detect signal quality in the macro coverage area, compare the signal quality to a predetermined threshold, and switch between modes of operation based on results of the comparison. For example, when a determination is made that the signal quality exceeds the threshold, a first mode of operation may perform the interference cancellation, while permitting simultaneous transmission and reception by transceivers 518 and 520. In contrast, when a determination is made that the signal quality has dropped below the threshold, then the NL process may be synchronized with the transmission gaps (e.g., synchronized to occur only during the transmission gaps), and the femto transmitter may be inhibited or suspended during the NL process. In this way, interference may be avoided rather than cancelled.

Figure 6:
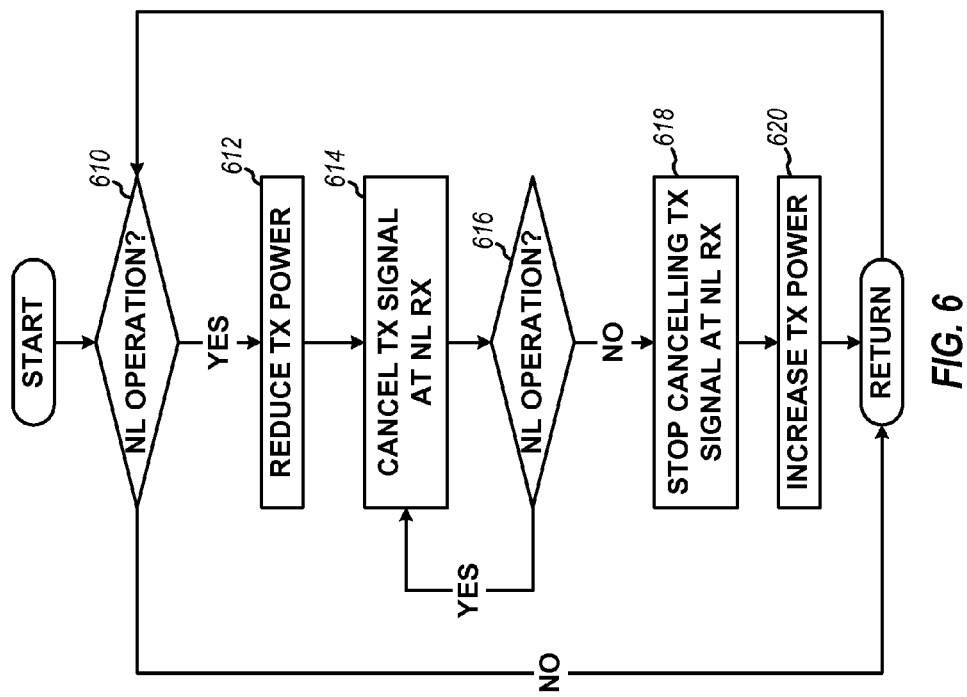
FIG. 6 is a functional block diagram illustrating example blocks executed to implement one aspect of the present disclosure.

Turning now to FIG. 6, example blocks executed by processors configured to operate as described above may carry out an interference cancellation process. In the interference cancellation process, femto transmitter operations and NL operations may both occur simultaneously, and femto transmitter power may be reduced during NL operations. Accordingly, a determination may be made, at block 610, whether an NL operation is occurring. If it is determined, at block 610, that the NL operation is not occurring, then processing may return to a previous point in the process, such as block 610, allowing femto transmissions to continue without interruption or power reduction. Otherwise, if it is determined, at block 610, that the NL operation is occurring, then transmit power of the femto transmitter may be reduced at block 612, and a transmit signal from the femto transmitter may be used, at block 614, to cancel interference at the NL receiver. Also, a further determination may be made, at block 616, whether the NL operation is still occurring. If it is determined, at block 616, that the NL operation is still occurring, then processing may return to block 614. Otherwise, if it is determined, at block 616, that the NL operation has terminated, then the interference cancellation may cease at block 618, transmit power of the femto transmitter may be increased at block 620, and processing may return as previously described.

Figure 7:
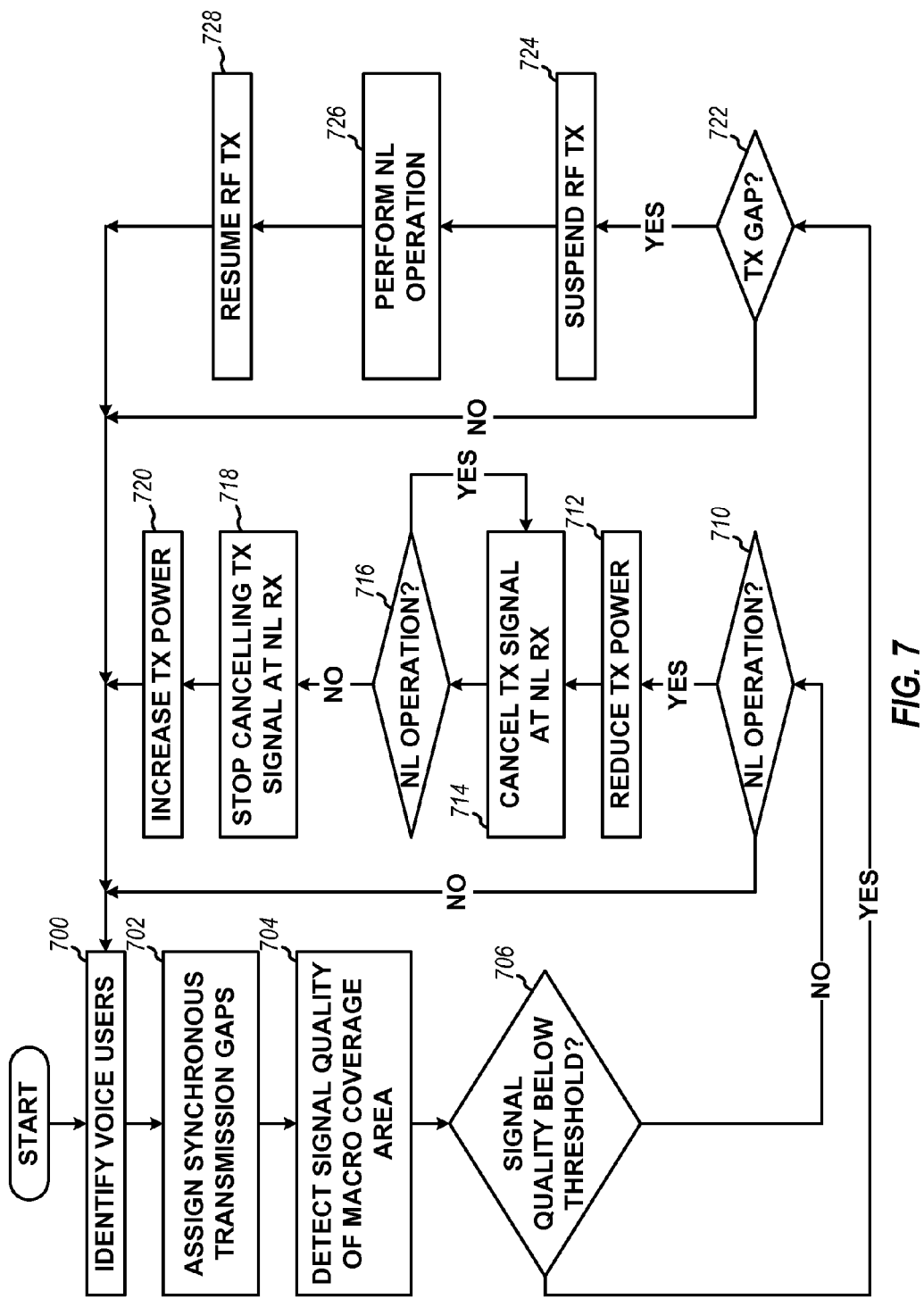
FIG. 7 is a functional block diagram illustrating example blocks executed to implement one aspect of the present disclosure.

Turning now to FIG. 7, example blocks executed by processors configured to operate as described above may include compressed mode blocks and interference mitigation blocks. Compressed mode places gaps in the downlink and uplink transmissions that allow a UE, while on a call, to perform measurements on neighboring cells of a different frequency than its current serving cell. Accordingly, it is envisioned that UEs of voice users may be placed into compressed mode for purposes other than or in addition to permitting a femto to avoiding interference with the femto's network listen process. Accordingly, voice users may be identified at block 700, and synchronous transmission gaps may be assigned at block 702. Also, signal quality of the macro coverage area may be detected at block 704, and a determination may be made, at block 706, regarding whether the signal quality is below a threshold. If it is determined, at block 706, that the signal quality is not below the threshold, then an interference cancellation mode may be entered at block 710. Otherwise, if it is determined, at block 706, that the signal quality is below the threshold, then an interference avoidance mode may be entered at block 722.

In the interference cancellation mode, femto transmitter operations and NL operations may both occur simultaneously, and femto transmitter power may be reduced during NL operations. Accordingly, a determination may be made, at block 710, whether an NL operation is occurring. If it is determined, at block 710, that the NL operation is not occurring, then processing may return to block 700, and femto transmissions may continue without interruption or power reduction. Otherwise, if it is determined, at block 710, that the NL operation is occurring, then transmit power of the femto transmitter may be reduced at block 712, and a transmit signal from the femto transmitter may be used, at block 714, to cancel interference at the NL receiver. Also, a further determination may be made, at block 716, whether the NL operation is still occurring. If it is determined, at block 716, that the NL operation is still occurring, then processing may return to block 714. Otherwise, if it is determined, at block 716, that the NL operation has terminated, then the interference cancellation may cease at block 718, transmit power of the femto transmitter may be increased at block 720, and processing may return to block 700.

In the interference avoidance mode, femto transmitter operations and NL operations may be inhibited or suspended to avoid interference in a manner that is synchronous with the transmission gaps. Accordingly, a determination may be made, at block 722, whether a transmission gap is occurring. If it is determined, at block 722, that a transmission gap is not occurring, then processing may return to block 700. Otherwise, if it is determined, at block 722, that a transmission gap is occurring, the RF transmitter may be suspended or inhibited at block 724, and the NL operation may be performed at block 726. Once the NL operation is completed, the femto transmitter may be resumed or uninhibited at block 728, and processing may return to block 700.

Figure 8:
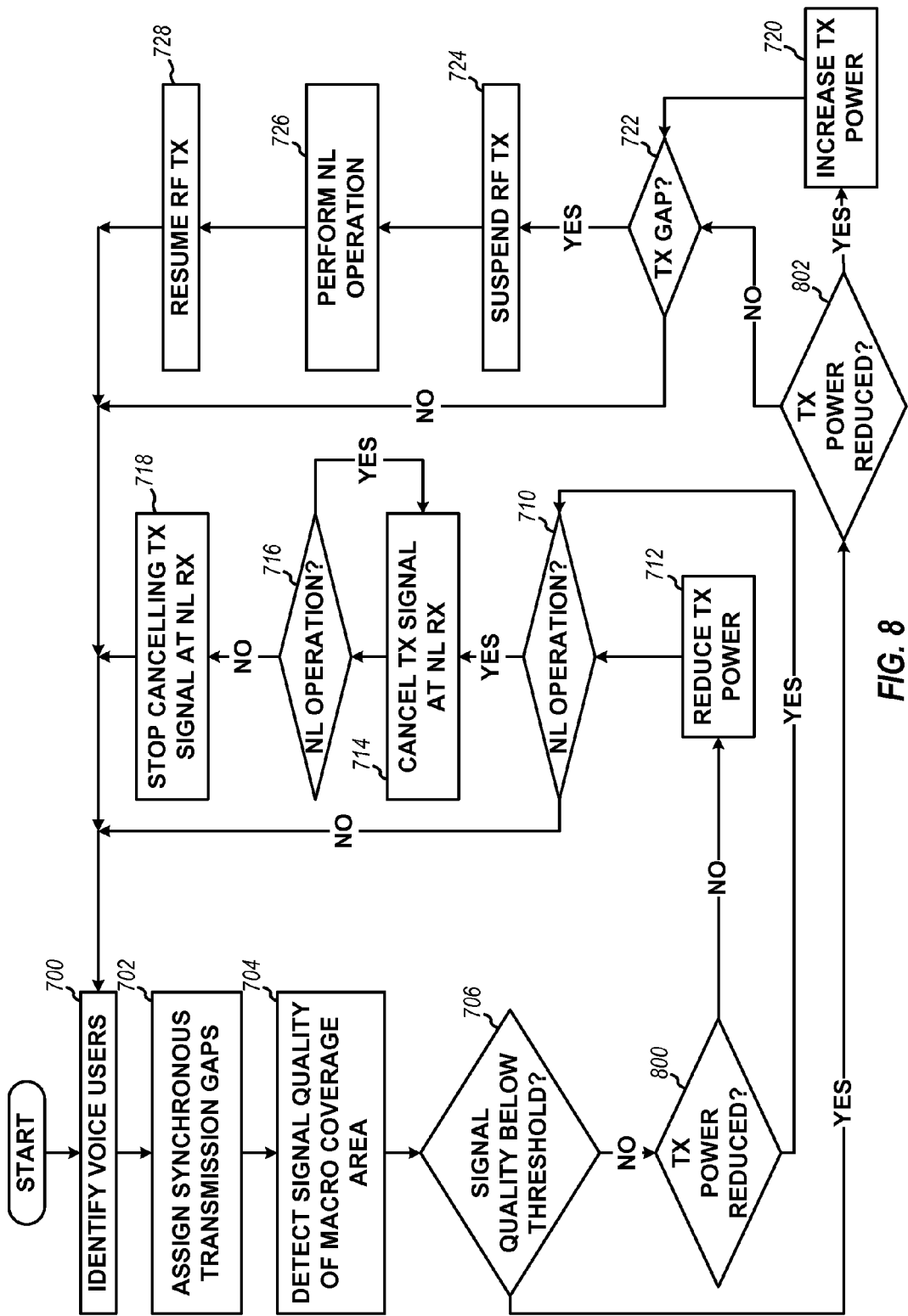
FIG. 8 is a functional block diagram illustrating example blocks executed to implement one aspect of the present disclosure.

Turning now to FIG. 8, alternative example blocks executed by processors configured to operate as described above may include compressed mode blocks, 700 and 702, and interference mitigation blocks, 704-728, as described above with reference to FIG. 7. However, in this alternative implementation, the reduction of transmitter power, at block 712, may be rendered responsive primarily to the determination, at block 706, that the signal quality exceeds the threshold, and rendered independent of occurrence of the NL operation. In this implementation, a determination may be made at the start of the interference cancellation mode loop, at block 800, whether transmitter power is already at a reduced level. If it is determined, at block 800, that transmitter power has not yet been reduced, then the interference cancellation mode may proceed to block 712, resulting in reduction of transmitter power. On the other hand, if it is determined, at block 800, that transmitter power is already at the reduced level, then block 712 may be skipped. Accordingly, transmitter power may be reduced upon initial entry to the interference cancellation mode, and remain reduced until such time as a determination is made, at block 706, that the signal quality has fallen below the threshold quality, triggering entry to the interference avoidance mode.

Upon entry to the interference avoidance mode, another determination may be made, at block 802, whether transmitter power is still reduced. If it is determined, at block 802, that the transmitter power is still at the reduced level, then transmitter power may be increased at block 720. On the other hand, if it is determined, at block 802, that the transmitter power is no longer at the reduced level, then block 720 may be skipped. Accordingly, transmitter power may be increased upon initial entry to the interference avoidance mode, and remain increased until such time as a determination is made, at block 706, that the signal quality has risen above the threshold quality, triggering entry or reentry to the interference cancellation mode.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, comprising:
   reducing transmission power, by a femto base station, at a radio frequency (RF) transmitter of the femto base station; and
   canceling a transmitted data signal, by the femto base station, at a network listen (NL) receiver of the femto base station during a network listen process of the femto base station, wherein the transmitted data signal was transmitted by the RF transmitter at the reduced transmission power,
   wherein the reduction of transmission power occurs in response to at least one of:
      occurrence of the network listen process; or
      a signal quality of a macro coverage area in which the femto base station is located exceeding a threshold quality.

2. The method of claim 1, wherein the canceling comprises at least one of:
   canceling the transmitted data signal at an RF level;
   canceling the transmitted data signal at a base band level; or
   canceling a portion of the transmitted data signal at the RF level and another portion of the transmitted data signal at the base band level.

3. The method of claim 1, further comprising:
   detecting the signal quality of the macro coverage area in which the femto base station is located; and
   in response to the signal quality being below the threshold quality:
      suspending the reducing transmission power and the canceling the transmitted data signal;
      suspending, by the femto base station, the RF transmitter of the femto base station during each of a plurality of transmission gaps assigned to one or more user equipments (UEs) in communication with the femto base station; and
      triggering a network listen operation in response to the suspending the RF transmitter, wherein the network listen operation occurs within the duration of each of the plurality of transmission gaps.

4. The method of claim 3, further comprising:
   detecting a gap of the plurality of transmission gaps;
   in response to the detecting:
      switching a transmission signal path away from the RF transmitter; and
      switching the reception signal path to an NL module to perform the network listen operation.

5. The method of claim 3, further comprising:
   assigning synchronous plurality of transmission gaps to each of the one or more UEs in communication with the femto base station.

6. The method of claim 3, further comprising:
   identifying one or more voice users of the one or more UEs; and
   assigning the plurality of transmission gaps to each of the identified one or more voice users.

7. An apparatus for wireless communications, said apparatus comprising:
   means for reducing transmission power, by a femto base station, at a radio frequency (RF) transmitter of the femto base station; and
   means for canceling a transmitted data signal during a network listen process of the femto base station, by the femto base station, at a network listen (NL) receiver of the femto base station, wherein the transmitted data signal was transmitted by the RF transmitter at the reduced transmission power, wherein the means for reducing transmission power operatively reduces the transmission power in response to at least one of:
  occurrence of the network listen process; or
  a signal quality of a macro coverage area in which the femto base station is located exceeding a threshold quality.

8. The apparatus of claim 7, wherein the means for canceling comprises at least one of:
  means for canceling the transmitted data signal at an RF level;
  means for canceling the transmitted data signal at a base band level; or
  means for canceling a portion of the transmitted data signal at the RF level and another portion of the transmitted data signal at the base band level.

9. The apparatus of claim 7, further comprising:
  means for detecting the signal quality of the macro coverage area in which the femto base station is located; and
  in response to the signal quality being below the threshold quality:
    means for suspending the means for reducing transmission power and the means for canceling the transmitted data signal;
    means for suspending, by the femto base station, the RF transmitter of the femto base station during each of a plurality of transmission gaps assigned to one or more user equipments (UEs) in communication with the femto base station; and
    means for triggering a network listen operation in response to suspension of the RF transmitter, wherein the network listen operation occurs within the duration of each of the plurality of transmission gaps.

10. The apparatus of claim 9, further comprising:
  means for detecting a gap of the plurality of transmission gaps;
  in response to detection of the gap:
    means for switching a transmission signal path away from the RF transmitter; and
    means for switching the reception signal path to an NL module to perform the network listen operation.

11. The apparatus of claim 9, further comprising:
  means for assigning synchronous plurality of transmission gaps to each of the one or more UEs in communication with the femto base station.

12. The apparatus of claim 9, further comprising:
  means for identifying one or more voice users of the one or more UEs; and
  means for assigning the plurality of transmission gaps to each of the identified one or more voice users.

13. A computer program product comprising:
  a non-transitory computer-readable medium including:
    code that, when enacted by one or more computer processors, causes the one or more computer processors to carry out one or more operations for reducing transmission power, by a femto base station, at a radio frequency (RF) transmitter of the femto base station; and
    code that, when enacted by the one or more computer processors, causes the one or more computer processors to carry out one or more operations for canceling a transmitted data signal, by the femto base station, at a network listen (NL) receiver of the femto base station during a network listen process of the femto base station, wherein the transmitted data signal was transmitted by the RF transmitter at the reduced transmission power,
    wherein the code that, when enacted by the one or more computer processors, causes the one or more computer processors to carry out one or more operations for reducing transmission power operatively reduces the transmission power in response to at least one of:
      occurrence of the network listen process; or
      a signal quality of a macro coverage area in which the femto base station is located exceeding a threshold quality.

14. The computer program product of claim 13, wherein the non-transitory computer-readable medium includes at least one of:
  code that, when enacted by the one or more computer processors, causes the one or more computer processors to carry out one or more operations for canceling the transmitted data signal at an RF level;
  code that, when enacted by the one or more computer processors, causes the one or more computer processors to carry out one or more operations for canceling the transmitted data signal at a base band level; or
  code that, when enacted by the one or more computer processors, causes the one or more computer processors to carry out one or more operations for canceling a portion of the transmitted data signal at the RF level and another portion of the transmitted data signal at the base band level.

15. The computer program product of claim 13, wherein the non-transitory computer-readable medium further includes:
  code that, when enacted by the one or more computer processors, causes the one or more computer processors to carry out one or more operations for detecting the signal quality of the macro coverage area in which the femto base station is located; and
  in response to the signal quality being below the threshold quality:
    code that, when enacted by the one or more computer processors, causes the one or more computer processors to carry out one or more operations for suspending the code that, when enacted by the one or more computer processors, causes the one or more computer processors to carry out one or more operations for reducing transmission power and the canceling the transmitted data signal;
    code that, when enacted by the one or more computer processors, causes the one or more computer processors to carry out one or more operations for suspending, by the femto base station, the RF transmitter of the femto base station during each of a plurality of transmission gaps assigned to one or more user equipments (UEs) in communication with the femto base station; and
    code that, when enacted by the one or more computer processors, causes the one or more computer processors to carry out one or more operations for triggering a network listen operation in response to suspension of the RF transmitter, wherein the network listen operation occurs within the duration of each of the plurality of transmission gaps.

16. The computer program product of claim 15, wherein the non-transitory computer-readable medium further includes:
  code that, when enacted by the one or more computer processors, causes the one or more computer processors to carry out one or more operations for detecting a gap of the plurality of transmission gaps;

in response to detection of the gap:
  code that, when enacted by the one or more computer processors, causes the one or more computer processors to carry out one or more operations for switching a transmission signal path away from the RF transmitter; and
  code that, when enacted by the one or more computer processors, causes the one or more computer processors to carry out one or more operations for switching the reception signal path to an NL module to perform the network listen operation.

17. The computer program product of claim 15, wherein the non-transitory computer-readable medium further includes:
  code that, when enacted by the one or more computer processors, causes the one or more computer processors to carry out one or more operations for assigning synchronous plurality of transmission gaps to each of the one or more UEs in communication with the femto base station.

18. The computer program product of claim 15, wherein the non-transitory computer-readable medium further includes:
  code that, when enacted by the one or more computer processors, causes the one or more computer processors to carry out one or more operations for identifying one or more voice users of the one or more UEs; and
  code that, when enacted by the one or more computer processors, causes the one or more computer processors to carry out one or more operations for assigning the plurality of transmission gaps to each of the identified one or more voice users.

19. A femto base station, the femto base station comprising:
  at least one processor; and
  a memory coupled to said at least one processor,
  wherein said at least one processor is configured to:
    reduce transmission power, by the femto base station, at a radio frequency (RF) transmitter of the femto base station; and
    cancel a transmitted data signal, by the femto base station, at a network listen (NL) receiver of the femto base station during a network listen process of the femto base station, wherein the transmitted data signal was transmitted by the RF transmitter at the reduced transmission power, and
  wherein said at least one processor operatively reduces transmission power in response to at least one of:
    occurrence of the network listen process; or
    a signal quality of a macro coverage area in which the femto base station is located exceeding a threshold quality.

20. The femto base station of claim 19, wherein the at least one processor is further configured to at least one of:
  cancel the transmitted data signal at an RF level;
  cancel the transmitted data signal at a base band level; or
  cancel a portion of the transmitted data signal at the RF level and another portion of the transmitted data signal at the base band level.

21. The femto base station of claim 19, wherein the at least one processor is further configured to:
  detect the signal quality of the macro coverage area in which the femto base station is located; and
  in response to the signal quality being below the threshold quality:
    suspend reduction of transmission power and cancelation of the transmitted data signal;
    suspend, by the femto base station, the RF transmitter of the femto base station during each of a plurality of transmission gaps assigned to one or more user equipments (UEs) in communication with the femto base station; and
    trigger a network listen operation in response to suspension of the RF transmitter, wherein the network listen operation occurs within the duration of each of the plurality of transmission gaps.

22. The femto base station of claim 21, wherein the at least one processor is further configured to:
  detect a gap of the plurality of transmission gaps;
  in response to detection of the gap:
    switch a transmission signal path away from the RF transmitter; and
    switch the reception signal path to an NL module to perform the network listen operation.

23. The femto base station of claim 21, wherein the at least one processor is further configured to:
  assign synchronous plurality of transmission gaps to each of the one or more UEs in communication with the femto base station.

24. The femto base station of claim 21, wherein the at least one processor is further configured to:
  identify one or more voice users of the one or more UEs; and
  assign the plurality of transmission gaps to each of the identified one or more voice users.

* * * * *